United States Patent
Dao et al.

(10) Patent No.: US 6,562,122 B2
(45) Date of Patent: May 13, 2003

(54) LIGHTWEIGHT WELL CEMENT COMPOSITIONS AND METHODS

(75) Inventors: Bach Dao, Niuew-vennep (NL); Krishna M. Ravi, Kingwood, TX (US); Jan Pieter Vijn, Leiderdorp (NL); Christine Noik, Le Pecq (FR); Alain Rivereau, Rueil-Malmaison (FR)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/086,024

(22) Filed: Feb. 28, 2002

(65) Prior Publication Data

US 2003/0000423 A1 Jan. 2, 2003

Related U.S. Application Data

(63) Continuation of application No. 09/664,487, filed on Sep. 18, 2000, now abandoned.

(51) Int. Cl.$^7$ .............................................. C04B 14/22
(52) U.S. Cl. ....................... 106/705; 106/716; 106/737; 106/814
(58) Field of Search ................................ 106/705, 716, 106/737, 814, DIG. 1

(56) References Cited

U.S. PATENT DOCUMENTS

| | | | | |
|---|---|---|---|---|
| 4,234,344 | A | 11/1980 | Tinsley et al. | 106/88 |
| 4,555,269 | A | 11/1985 | Rao et al. | 106/90 |
| 4,557,763 | A | 12/1985 | George et al. | 106/90 |
| 4,676,317 | A | 6/1987 | Fry et al. | 166/293 |
| 4,721,160 | A | 1/1988 | Parcevaux et al. | 166/293 |
| 4,761,183 | A | 8/1988 | Clarke | 106/117 |
| 4,880,468 | A | 11/1989 | Bowlin et al. | 106/98 |
| 5,086,850 | A | 2/1992 | Harris et al. | 175/61 |
| 5,121,795 | A | 6/1992 | Ewert et al. | 166/292 |
| 5,123,487 | A | 6/1992 | Harris et al. | 166/277 |
| 5,125,455 | A | 6/1992 | Harris et al. | 166/292 |
| 5,127,473 | A | 7/1992 | Harris et al. | 166/277 |
| 5,188,176 | A | 2/1993 | Carpenter | 166/285 |
| 5,346,012 | A | 9/1994 | Heathman et al. | 166/293 |
| 5,355,954 | A | 10/1994 | Onan et al. | 166/292 |
| 5,398,758 | A | 3/1995 | Onan et al. | 166/292 |
| 5,484,019 | A | 1/1996 | Griffith | 166/293 |
| 5,536,311 | A | 7/1996 | Rodrigues | 106/724 |
| 5,571,318 | A | 11/1996 | Griffith et al. | 106/725 |
| 5,588,488 | A | 12/1996 | Vijn et al. | 166/293 |
| 5,588,489 | A | 12/1996 | Chatterji et al. | 166/293 |
| 5,696,059 | A | 12/1997 | Onan et al. | 507/269 |
| 5,711,383 | A | 1/1998 | Terry et al. | 175/72 |
| 5,711,801 | A | 1/1998 | Chatterji et al. | 106/789 |
| 5,716,910 | A | 2/1998 | Totten et al. | 507/102 |
| 5,791,380 | A | 8/1998 | Onan et al. | 138/149 |
| 5,820,670 | A | 10/1998 | Chatterji et al. | 106/727 |
| 5,851,960 | A | 12/1998 | Totten et al. | 507/118 |
| 6,060,535 | A | 5/2000 | Villar et al. | 523/130 |
| 6,170,575 | B1 | 1/2001 | Reddy et al. | 166/293 |
| 6,312,515 | B1 | 11/2001 | Barlet-Gouedard et al. | 106/709 |

FOREIGN PATENT DOCUMENTS

| | | |
|---|---|---|
| EP | 0 748 782 A1 | 12/1996 |
| EP | 0 832 861 A1 | 4/1998 |
| EP | 0 621 247 B1 | 7/1999 |
| WO | WO 97/28097 | 8/1997 |
| WO | WO 00/29351 | 5/2000 |
| WO | WO 00/50357 | 8/2000 |
| WO | WO 01/09056 A1 | 2/2001 |
| WO | WO 01/25163 A1 | 4/2001 |
| WO | WO 01/87796 A1 | 11/2001 |
| WO | WO 01/87797 A1 | 11/2001 |

OTHER PUBLICATIONS

Halliburton brochure entitled "CFR–3 Friction Reducer," 1998.
Halliburton brochure entitled "Dyckerhoff Cement," 1998.
Halliburton brochure entitled "Micro Fly Ash," 1999.
Halliburton brochure entitled "Pozmix A," 1999.
Halliburton brochure entitled "SCR–100 Cement Retarder," 1994.
Halliburton brochure entitled "SCR–100," 1999.
Halliburton brochure entitled "Silicalite," 1999.
Halliburton brochure entitled "Spherelite," 1999.
Halliburton brochure entitled "SSA–1," 1998.
Halliburton brochure entitled "SSA–2", 1999.

*Primary Examiner*—Paul Marcantoni
(74) *Attorney, Agent, or Firm*—Craig W. Roddy; C. Clark Dougherty, Jr.

(57) ABSTRACT

Lightweight cement compositions and methods of cementing a subterranean zone penetrated by a well bore utilizing the compositions are provided. A lightweight cement composition of the invention is basically comprised of a coarse particulate hydraulic cement, an ultrafine particulate hydraulic cement mixture comprised of slag cement and a Portland or equivalent cement, fly ash, fumed silica, hollow glass spheres and water.

20 Claims, No Drawings

LIGHTWEIGHT WELL CEMENT COMPOSITIONS AND METHODS

This Application is a Continuation of application Ser. No. 09/664,487 filed on Sep. 18, 2000, now abandoned.

BACKGROUND OF THE INVENTION

1. Field of the Invention

The present invention relates to lightweight well cement compositions and methods of cementing subterranean zones penetrated by well bores using the compositions.

2. Description of the Prior Art

In carrying out completion operations in oil, gas and water wells, hydraulic cement compositions are commonly utilized. For example, hydraulic cement compositions are used in primary cementing operations whereby pipe is cemented in the well bore. That is, a hydraulic cement composition is pumped into the annular space between the walls of the well bore and the exterior of a pipe disposed therein. The cement composition is permitted to set in the annular space thereby forming an annular sheath of hardened impermeable cement therein. The objective of the cement sheath is to physically support and position the pipe in the well bore and bond the pipe to the walls of the well bore whereby the undesirable migration of fluids between zones or formations penetrated by the well bore is prevented.

Recently the need for better economics, higher productivity, environment protection and more efficient well operations has brought about new well drilling and completing techniques. Examples of such new techniques include the reduction of the well bore diameter (referred to as a slim hole) and extending the reservoir penetration by drilling small lateral well bores which are completed using small diameter pipe such as coiled tubing to increase the productivity of the reservoir. The performance of primary cementing operations in the smaller annular spaces in the well bores requires improved lightweight cement compositions having low viscosities so that the cement compositions can be accurately placed. In addition, the cement compositions must have good static gel strength, low rheology, high compressive strength, low fluid loss, low permeability, good chemical resistance and a broad operating temperature range. That is, the cement compositions must be suitable for use at temperatures in the range of from about 45° F. to 270° F.

Thus, there are needs for improved lightweight cement compositions and methods of using the compositions for cementing pipe in well bores.

SUMMARY OF THE INVENTION

The present invention provides improved lightweight cement compositions and methods of cementing subterranean zones utilizing the compositions which meet the needs described above and overcome the deficiencies of the prior art. The lightweight cement compositions of the invention are basically comprised of a coarse particulate hydraulic cement; an ultrafine particulate hydraulic cement mixture comprised of slag cement and a Portland or equivalent cement present in an amount in the range of from about 50% to about 150% by weight of the coarse particulate hydraulic cement in the composition; fly ash present in an amount in the range of from about 50% to about 150% by weight of the coarse particulate hydraulic cement in the composition; fumed silica present in an amount in the range of from about 20% to about 60% by weight of the coarse particulate hydraulic cement in the composition; hollow glass spheres present in an amount sufficient to impart a density to the cement composition in the range of from about 9 to about 13 pounds per gallon; and water present in an amount sufficient to form a slurry. The cement compositions also preferably include a fluid loss control additive present in an amount in the range of from about 0.2% to about 8% by weight of the coarse particulate hydraulic cement in the composition.

The coarse particulate hydraulic cement has a particle size no greater than about 118 microns and a specific surface area no less than about 2800 square centimeters per gram. The slag cement and Portland or equivalent cement in the ultrafine cement mixture has a particle size no greater than about 30 microns, a mean particle size of 6 microns and a specific surface area no less than about 6000 centimeters per gram.

The methods of the present invention for cementing a subterranean zone penetrated by a well bore are comprised of the following steps. A lightweight cement composition of the invention is prepared comprised of a coarse particulate hydraulic cement, an ultrafine particulate hydraulic cement mixture of slag cement and Portland or equivalent cement, fly ash, fumed silica, hollow glass spheres, sufficient water to form a slurry and optionally, a fluid loss control additive. After preparation, the cement composition is placed in the subterranean zone to be cemented and the cement composition is allowed to set into a hard impermeable mass.

When the subterranean zone to be cemented has a temperature in the range of from about 45° F. to about 100° F., a cement composition set accelerator is included in the cement composition. When the subterranean zone has a temperature in the range of from about 100° F. to about 270° F., a set accelerator and a dispersing agent are included in the cement composition. When the subterranean zone has a temperature in the range of from about 230° F. to about 270° F., a cement composition set retarder and silica flour are included in the cement composition. The silica flour functions to prevent set cement strength retrogression.

It is, therefore, an object of the present invention to provide improved lightweight well cementing compositions and methods.

Other and further objects, features and advantages of the present invention will be readily apparent to those skilled in the art upon a reading of the description of preferred embodiments which follows.

DESCRIPTION OF THE PREFERRED EMBODIMENTS

The present invention provides universal non-foamed lightweight cement compositions and methods of using the compositions for cementing subterranean zones penetrated by well bores. The lightweight cement compositions can be used over a broad temperature range, i.e., from about 45° F. to about 270° F. at densities in the range of from about 9 to about 13 pounds per gallon. The cement compositions have excellent properties including high static gel strengths, low rheologies, low fluid loss, high compressive strength upon setting, low permeability upon setting and resistance to chemical deterioration and failure due to sulfate degradation or the like.

The lightweight cement compositions of this invention are basically comprised of a coarse particulate hydraulic cement; an ultrafine particulate hydraulic cement mixture comprised of slag cement and a Portland or equivalent cement, fly ash, fumed silica, hollow glass spheres, water present in an amount sufficient to form a slurry and optionally, a fluid loss control additive.

The coarse particulate hydraulic cement can be any of a variety of hydraulic cements having a maximum particle size of about 118 microns and a specific surface area of about 2800 square centimeters per gram. Portland cement is generally preferred, and the coarse cement can be, for example, one or more of the various Portland cements designated as API Classes A-H cements. These cements are identified and defined in the *API Specification For Materials And Testing For Well Cements,* API Specification 10, 5$^{th}$ Edition, dated Jul. 1, 1990 of the American Petroleum Institute. API Portland cements generally have a maximum particle size of about 90 microns and a specific surface of about 3900 square centimeters per gram. When an API Portland cement is utilized as the coarse hydraulic cement in accordance with this invention, it is preferably API Class G cement. Other hydraulic cements which are more coarse than API Portland cement can also be used up to the maximum particle size set forth above. When more coarse cements are used, they preferably have properties which are the same or similar as API Class G cement.

The ultrafine particulate hydraulic cement mixture comprised of slag cement and a Portland or equivalent cement has a particle size no greater than about 30 microns, a mean particle size of 6 microns and a specific surface area no less than about 6,000 centimeters per gram. Preferably the ultrafine particulate hydraulic cement mixture has a particle size no greater than about 17 microns and a specific surface area no less than about 7,000 centimeters per gram, and more preferably, a particle size no greater than about 11 microns and a specific surface area no less than about 10,000 centimeters per gram. Ultrafine particulate hydraulic cement mixtures of slag cement and Portland or equivalent cement having particle sizes and specific surface areas as described above are disclosed in U.S. Pat. No. 4,761,183 issued on Aug. 2, 1988 to Clarke which is incorporated herein by reference. The preferred ultrafine cement mixture for use in accordance with this invention is comprised of slag cement and Portland or equivalent cement wherein the slag cement is present in the mixture in an amount of at least about 50% by weight of the mixture. The slag cement is more preferably included in the ultrafine cement mixture in an amount of about 65% by weight of the mixture and most preferably in an amount of about 75% by weight of the mixture.

The ultrafine particulate hydraulic cement mixture as described above in combination with the coarse particulate hydraulic cement provides high compressive strengths to the set cement compositions of this invention. The ultrafine particulate hydraulic cement mixture is included in the lightweight cement composition of this invention in an amount in the range of from about 50% to about 150% by weight of the coarse particulate hydraulic cement in the composition.

The fly ash utilized in the lightweight cement compositions of this invention is preferably ASTM Class F fly ash. The fly ash functions as a lightweight filler in the cement compositions and in combination with the coarse particulate hydraulic cement provides low permeability to the cement compositions upon setting. The fly ash is included in the cement compositions in an amount in the range of from about 50% to about 150% by weight of the coarse particulate hydraulic cement in the composition.

The fumed silica provides thickening and thixotropic properties to the cement compositions. The fumed silica is included in the cement compositions in an amount in the range of from about 20% to about 60% by weight of the coarse particulate hydraulic cement therein.

The hollow glass spheres are included in the cement compositions of this invention to make them lightweight, i.e., to provide low densities to the compositions. Particularly suitable such hollow glass spheres are commercially available from Halliburton Energy Services, Inc. of Duncan, Okla., under the trade designation "SILICALITE™." The hollow glass spheres are included in the cement compositions of this invention in an amount in the range of from about 21% to about 310% by weight of the coarse particulate hydraulic cement therein to provide densities to the cement compositions in the range of from about 9 to about 13 pounds per gallon.

The water in the cement compositions of this invention can be fresh water, unsaturated salt solutions or saturated salt solutions including brine and seawater. The water is included in the cement composition in an amount sufficient to form a pumpable slurry, i.e., an amount in the range of from about 128% to about 400% by weight of the coarse particulate hydraulic cement in the compositions.

The cement compositions of this invention also preferably include a fluid loss control additive. While a variety of fluid loss control additives can be utilized, a preferred fluid loss control additive is comprised of a mixture of a graft copolymer having a backbone of lignin, lignite or salts thereof and a grafted pendant group of 2-acrylamido-2-methylpropanesulfonic acid and a copolymer or copolymer salt of N,N-dimethylacrylamide and 2-acrylamido-2-methyl propane sulfonic acid. The above described graft copolymer is disclosed in U.S. Pat. No. 4,676,317 issued to Fry et al. on Jun. 30, 1987 and the above described copolymer or copolymer salt is disclosed in U.S. Pat. No. 4,555,269 issued to Rao et al. on Nov. 26, 1985, both of which are incorporated herein by reference. The mixture of the above fluid loss control additives provides a synergistic increase in fluid loss control and brings about less settling and less free water. When used, the fluid loss control additive is included in the cement compositions of this invention in an amount in the range of from about 0.2% to about 8% by weight of the coarse particulate hydraulic cement in the compositions.

As mentioned, the lightweight cement compositions of this invention can be utilized over a broad temperature range of from about 45° F. to about 270° F. The density of the cement compositions can be varied by varying the amounts of the hollow glass spheres included in the compositions. That is, the lightweight compositions of this invention can have a density from about 9 to about 13 pounds per gallon. The ability to vary the density is important in cementing subterranean zones in that low density cement compositions often must be used to prevent fracturing of the subterranean zones and lost circulation from taking place. The cement compositions of this invention have low rheologies whereby when required they can be pumped at turbulent flow. Pumping the cement composition at turbulent flow aids in displacing drilling fluid from the well bore. The low rheology of the cement composition also produces low friction pressure when the composition is pumped which lowers the risk of fracturing easily fractured zones or formations. When the cement compositions of this invention are utilized in the above mentioned slim hole completions, low rheology is particularly important in preventing fracturing of weak subterranean zones or formations.

When the cement composition of this invention is used in low temperature applications, i.e., applications where the zone being cemented has a temperature in the range of from about 45° F. to about 100° F., a cement composition set accelerator and a cement composition dispersing agent are preferably included in the composition. As will be understood by those skilled in the art, the set accelerator shortens the time required for the cement composition to set at the low temperatures involved and the dispersing agent lowers the rheology of the cement composition.

While a variety of cement composition set accelerators can be utilized, calcium chloride is presently preferred. When used, the set accelerator is included in the cement composition in an amount in the range of from about 1% to about 12% by weight of the coarse particulate hydraulic cement therein.

A variety of dispersing agents can also be utilized in accordance with this invention. A particularly suitable such dispersing agent is the condensation product of acetone, formaldehyde and sodium sulfite. Such a dispersing agent is commercially available from Halliburton Energy Services, Inc. of Duncan, Okla., under the tradename "CFR-3™." The dispersing agent utilized is included in the cement composition in an amount in the range of from about 0.2% to about 8% by weight of the coarse particulate hydraulic cement in the composition.

When the temperature of the subterranean zone to be cemented is in the range of from about 100° F. to about 230° F., the above described cement composition set accelerator is preferably included therein.

When the subterranean zone or formation to be cemented has a temperature in the range of from about 230° F. to about 270° F., the above described cement composition preferably includes a cement composition set retarder and silica flour to prevent set cement strength retrogression. While various set retarders can be utilized, the set retarder used in accordance with this invention is preferably a copolymer of 2-acrylamido-2-methylpropanesulfonic acid and acrylic acid at temperatures up to 250° F. or a copolymer of 2-acrylamdio-2-methylpropane sulfonic acid and itaconic acid at temperatures above 250° F. Such set retarders are commercially available under the trade designations "SCR-100™" and "SCR-500™," respectively, from Halliburton Energy Services, Inc. of Duncan, Okla. The set retarder functions to delay the set of the cement composition until it has been placed in the subterranean zone to be cemented. The amount of set retarder utilized increases with increasing temperature and is generally included in the cement compositions of this invention in an amount in the range of from about 0.2% to about 8% by weight of the coarse particulate hydraulic cement in the compositions.

As indicated above, silica flour is included in the cement compositions to prevent the compressive strength of the set cement from decreasing over time due to the high temperature of the subterranean zone in which it is placed. When used, the silica flour is included in the cement compositions in an amount in the range of from about 20% to about 60% by weight of the coarse particulate hydraulic cement in the compositions.

In order to prevent the chemical degradation of the set cement composition of this invention, the coarse particulate hydraulic cement utilized can optionally be an API Class G Portland cement which does not contain tricalcium aluminate. The presence of tricalcium aluminate in the cement can cause sulfate degradation of the cement.

A particularly suitable lightweight cement composition of this invention is comprised of a coarse particulate API Class G Portland cement having a particle size no greater than about 118 microns and a specific surface area no less than about 2800 square centimeters per gram; an ultrafine particulate hydraulic cement mixture comprised of slag cement and a Portland or equivalent cement, the cement mixture having a particle size no greater than about 30 microns and a specific surface area no less than about 6,000 centimeters per gram and being present in an amount in the range of from about 50% to about 150% by weight of the coarse particulate hydraulic cement in the composition; ASTM Class F fly ash or the equivalent present in an amount in the range of from about 50% to about 150% by weight of the coarse particulate hydraulic cement in the composition; fumed silica present in an amount in the range of from about 20% to about 60% by weight of the coarse particulate hydraulic cement in the composition; hollow glass spheres present in an amount sufficient to impart a density to the cement composition in the range of from about 9 to about 13 pounds per gallon; and water present in an amount sufficient to form a slurry.

The water in the composition can be selected from the group consisting of fresh water, saturated salt solutions and unsaturated salt solutions including brine and seawater, and the water can be present in a general amount in the range of from about 128% to about 400% by weight of the coarse particulate hydraulic cement in the composition.

As indicated above, the composition preferably also includes a fluid loss control additive comprised of a mixture of the graft copolymer (Halliburton "SCR-100™") and the copolymer or copolymer salt (Halliburton "SCR-500™") described above in an amount in the range of from about 0.2% to about 8% by weight of the coarse particulate hydraulic cement in the composition.

Further, as also described above, depending on the temperature of the subterranean zone to be cemented, one or more additional additives are preferably included in the cement compositions of this invention. The additives include, but are not limited to, a cement composition set accelerator, a cement composition dispersing agent, a cement composition set retarder and silica flour for preventing set cement strength retrogression at elevated temperatures.

The methods of cementing a subterranean zone penetrated by a well bore in accordance with the present invention are basically comprised of the following steps. A lightweight cement composition of this invention basically comprised of a coarse particulate hydraulic cement, an ultrafine particulate hydraulic cement mixture of slag cement and a Portland or equivalent cement, fly ash, fumed silica, hollow glass spheres and sufficient water to form a slurry is prepared. Thereafter, the cement composition is placed in the subterranean zone to be cemented and the cement composition is allowed to set into a hard impermeable mass.

In order to further illustrate the lightweight cement compositions and methods of the present invention, the following examples are given.

EXAMPLE 1

A lightweight cement composition of the present invention was prepared comprising coarse particulate API Class G Portland cement (Dyckerhoff), an ultrafine particulate hydraulic cement mixture comprised of 75% by weight slag cement and 25% by weight of Portland or equivalent cement, ASTM Class F fly ash, fumed silica, hollow glass spheres, fresh water and a mixture of two fluid loss control agents, i.e., a graft polymer of lignin, lignite or their salts and a grafted pendant group comprised of 2-acrylamido-2-methylpropane sulfonic acid and a copolymer or copolymer salt of N,N-dimethylacrylamide and 2-acrylamido-2-methylpropane sulfonic acid. Test samples of the cement compositions were tested for density, thickening time, rheology, zero gel time and transition time in accordance with the procedures set forth in the above mentioned API Specification 10. In addition, the compressive strength of the cement composition after setting was determined. All of the above listed tests were performed at 45° F. The amounts of the components of the test cement composition as well as the test results are given in Table I below.

TABLE I

Cement Composition Properties At 45° F.

| Test Composition Components | Quantity, % by wt. of Coarse Cement | Density, lb/gal | Thickening Time To 100 Bc at 45° F., Hrs:min | Rheology 300-200-100-60-30-6-3 | Compressive Strength[1] | | | Zero Gel Time, Hrs:min | Transition Time, Hrs:min |
|---|---|---|---|---|---|---|---|---|---|
| | | | | | Time To 50 psi, Hrs:min | Time To 500 psi, Hrs:min | After 66 Hrs, psi | | |
| Portland Class G coarse cement[2] | | | | | | | | | |
| Ultrafine Cement[3] | 100 | | | | | | | | |
| Fly Ash[4] | 100 | | | | | | | | |
| Fumed Silica | 40 | | | | | | | | |
| Hollow Glass Spheres | 60 | 12.5 | 7:54 | 205-143-57-61-57-12-8 | 14:18 | 36:57 | 976 | 4:01 | 0:46 |
| Water | 161 | | | | | | | | |
| CaCl$_2$ | 9.6 | | | | | | | | |
| Fluid Loss Control Additive[5] | 3.6 | | | | | | | | |
| Dispersant[6] | 0.6 | | | | | | | | |

[1]Ultrasonic Cement Analyzer
[2]Dyckerhoff cement
[3]75% slag cement-25% Portland cement
[4]ASTM Class F fly ash
[5]Mixture of graft copolymer (U.S. Pat. No. 4,676,317) and copolymer or copolymer salt (U.S. Pat. No. 4,555,269)
[6]Condensation product of acetone, formaldehyde and sodium sulfite From Table I, it can be seen that the cement composition of this invention had excellent properties at 45° F.

EXAMPLE 2

A lightweight cement composition of this invention was prepared comprised of a coarse particulate API Class G Portland cement (Dyckerhoff), an ultrafine particulate hydraulic cement mixture comprised of slag cement and a Portland or equivalent cement, ASTM Class F fly ash, fumed silica, hollow glass spheres, fresh water, a cement set accelerator comprised of calcium chloride and a mixture of two fluid loss control additives, i.e., a graft polymer comprised of lignin, lignite or their salts and a grafted pendant group comprising 2-acrylamido-2-methylpropane sulfonic acid and a copolymer or copolymer salt of N,N-dimethylacrylamide and 2-acrylamido-2-methylpropane sulfonic acid. Test portions of the cement composition were tested for density, thickening time, rheology, fluid loss, and free water in accordance with the procedures set forth in the above mentioned API Specification 10. In addition, the compressive strength of the cement composition was determined. All of the above mentioned tests were determined at 100° F. The amounts of the various components in the cement composition tested as well as the test results are set forth in Table II below.

TABLE II

Cement Composition Properties At 100° F.

| Test Composition Components | Quantity, % by wt. of Coarse Cement | Density, lb/gal | Thickening Time To | | Rheology 300-200-100-60-30-6-3 | Fluid Loss, cc/30 min | Free Water, % | Spec. Gravity, top/ bottom | Compressive Strength,[1] | | | |
|---|---|---|---|---|---|---|---|---|---|---|---|---|
| | | | 70 Bc, Hrs:min | 100 Bc, Hrs:min | | | | | Time to 50 psi, Hrs:min | Time to 500 psi, Hrs:min | After 24 Hrs | Final, psi/hrs |
| Portland Class G Coarse Cement[2] | | | | | | | | | | | | |
| Ultrafine Cement[3] | 100 | | | | | | | | | | | |
| Fly Ash[4] | 100 | | | | | | | | | | | |
| Fumed Silica | 40 | 11.66 | 2:55 | 2:56 | 56-41-23-14-8-3-2.5 | 44 | 0 | 1.331/1.561 | 7:34 | 10:53 | 1816 | 2839/68 |
| Hollow Glass Spheres | 60 | | | | | | | | | | | |
| Water | 262 | | | | | | | | | | | |
| CaCl$_2$ | 12 | | | | | | | | | | | |
| Fluid Loss Control Additive[5] | 3.6 | | | | | | | | | | | |

[1]Ultrasonic Cement Analyzer

TABLE II-continued

Cement Composition Properties At 100° F.

| Test Composition Components | Quantity, % by wt. of Coarse Cement | Density, lb/gal | Thickening Time To 70 Bc, Hrs:min | 100 Bc, Hrs:min | Rheology 300-200-100-60-30-6-3 | Fluid Loss, cc/30 min | Free Water, % | Spec. Gravity, top/bottom | Compressive Strength,[1] Time to 50 psi, Hrs:min | Time to 500 psi, Hrs:min | After 24 Hrs | Final, psi/hrs |
|---|---|---|---|---|---|---|---|---|---|---|---|---|

[2]Dyckerhoff cement
[3]75% slag cement-25% Portland cement
[4]ASTM Class F fly ash
[5]Mixture of graft copolymer (U.S. Pat. No. 4,676,317) and copolymer or copolymer salt (U.S. Pat. No. 4,555,269)
[6]Condensation product of acetone, formaldehyde and sodium sulfite From Table II it can be seen that the tested cement composition of this invention had excellent properties at 100° F.

EXAMPLE 3

Five test cement compositions of the present invention were prepared containing various amounts of a coarse particulate API Class G Portland cement (Dyckerhoff), an ultrafine particulate hydraulic cement mixture comprised of slag cement and a Portland or equivalent cement, fly ash, fumed silica, hollow glass spheres, fresh water, silica flour, a mixture of two fluid loss control additives, i.e., a graft polymer comprised of lignin, lignite or their salts and a grafted pendant group comprised of 2-acrylamido-2-methylpropane sulfonic acid and a copolymer of N,N-dimethylacrylamide and 2-acrylamido-2-methylpropane sulfonic acid; and a set retarder selected from a copolymer of 2-acrylamido-2-methylpropane sulfonic acid and acrylic acid or a copolymer of 2-acrylamido-2-methylpropane sulfonic acid and itaconic acid. Test samples of each composition were tested for density, thickening time, rheology, fluid loss and free water in accordance with the procedure set forth in the above mentioned API Specification 10. The compressive strengths of set portions of the cement compositions were also determined. All of the tests were run at temperatures in the range of from 200° F. to 270° F. The amounts of the test cement composition components and the test results are set forth in Table III below.

TABLE III

Cement Composition Properties At 200° F. To 270° F.

| Test Composition No. | 1 | 2 | 3 | 4 | 5 |
|---|---|---|---|---|---|
| Test Composition Components, % by wt. Coarse Cement | | | | | |
| Portland Class G Coarse Cement[2] | | | | | |
| Ultrafine Cement[3] | 100 | 100 | 100 | 100 | 100 |
| Fly Ash[4] | 100 | 100 | 100 | 100 | 100 |
| Fumed Silica | 40 | 40 | 40 | 40 | 40 |
| Hollow Glass Spheres | 60 | 60 | 60 | 60 | 60 |
| Water | 264 | 264 | 264 | 264 | 264 |
| Fluid Loss Control Additive[5] | 6.10 | 6.10 | 6.10 | 5.10 | 5.10 |
| Set Retarder[6] | 1.32 | 2.2 | 2.2 | 0 | 0 |
| Set Retarder[7] | 0 | 0 | 0 | 2.34 | 2.34 |
| Silica Flour[8] | 0 | 0 | 0 | 0 | 0 |
| Density, lb/gal | 11.66 | 11.66 | 11.66 | 11.66 | 11.66 |
| Thickening Time To: | | | | | |
| Temperature, ° F. | 200 | 240 | 260 | 270 | 270 |
| 70 Bc, Hrs:min | 3:30 | 5:37 | — | 3:22 | 3:10 |
| 100 Bc, Hrs:min | 3:32 | 5:40 | 4:04 | 3:23 | 3:11 |
| Rheology at 195° F. | | | | | |
| 300 | 175 | 93 | 80 | 120 | 70 |
| 200 | 112 | 52 | 49 | 78 | 45 |
| 100 | 63 | 26 | 27 | 40 | 24 |
| 60 | 42 | 17 | 17 | 26 | 15 |
| 30 | 25 | 9 | 9 | 15 | 7 |
| 6 | 8 | 3 | 3 | 4 | 1 |
| 3 | 6 | 2 | 2 | 3 | 1 |
| Fluid Loss at 195° F. | | | | | |
| cc/30 min | 34 | 34 | 36 | 36 | 51 |
| Free Water, % | 0 | 0 | 0 | 0 | 0 |

TABLE III-continued

Cement Composition Properties At 200° F. To 270° F.

| Test Composition No. | 1 | 2 | 3 | 4 | 5 |
|---|---|---|---|---|---|
| Compressive Strength[1] | | | | | |
| Temperature, ° F. | 200 | 240 | 260 | 270 | 270 |
| Time to 50 psi, Hrs:min | 7:09 | 6:50 | 4:45 | 2:41 | — |
| Time to 500 psi, Hrs:min | 8:13 | 9:21 | 6:16 | 6:43 | 8:32 |
| After 24 hours, psi | 2400 | 1200 | 1531 | 700 | 1105 |
| psi/days | 2639/90 | 1465/2 | 1534/2 | 1877/84 | 1556/4 |
| psi/days | — | — | 1901/— | 1600/112 | 1850/120 |

[1]Ultrasonic Cement Analyzer
[2]Dyckerhoff cement
[3]75% slag-25% Portland cement
[4]ASTM Class F fly ash
[5]Mixture of graft copolymer (U.S. Pat. No. 4,676,317) and copolymer or copolymer salt (U.S. Pat. No. 4,555,269)
[6]Copolymer of 2-acrylamido-2-methylpropanesulfonic acid and acrylic acid.
[7]Copolymer of 2-acrylamido-2-methylpropanesulfonic acid and itaconic acid.
[8]Prevents set cement compressive strength retrogression.

From Table III, it can be seen that the lightweight cement compositions of the present invention have excellent properties at temperatures in the range of from 200° F. to 275° F.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A lightweight cement composition for cementing a subterranean zone penetrated by a well bore comprising:
   a coarse particulate hydraulic cement;
   an ultrafine particulate hydraulic cement mixture comprised of slag cement and a Portland or equivalent cement present in an amount in the range of from about 50% to about 150% by weight of said coarse particulate hydraulic cement in said composition;
   fly ash present in an amount in the range of from about 50% to about 150% by weight of said coarse particulate hydraulic cement in said composition;
   fumed silica present in an amount in the range of from about 20% to about 60% by weight of said coarse particulate hydraulic cement in said composition;
   hollow glass spheres present in an amount sufficient to impart a density to said cement composition in the range of from about 9 to about 13 pounds per gallon; and
   water present in an amount sufficient to form a slurry.

2. The composition of claim 1 wherein said coarse particulate hydraulic cement has a particle size no greater than about 118 microns and a specific surface area no less than about 2800 square centimeters per gram.

3. The composition of claim 1 wherein said coarse particulate hydraulic cement is API Class G Portland or the equivalent cement.

4. The composition of claim 1 wherein said slag cement in said ultrafine cement mixture has a particle size no greater than about 30 microns, a mean particle size of 6 microns and a specific surface area no less than about 6000 centimeters per gram.

5. The composition of claim 1 wherein said Portland or equivalent cement in said ultrafine cement mixture has a particle size no greater than about 30 microns, a mean particle size of 6 microns and a specific surface area no less than about 6000 centimeters per gram.

6. The composition of claim 1 wherein said slag cement in said ultrafine cement mixture is present in said mixture in an amount of at least about 50% by weight of said mixture.

7. The composition of claim 1 wherein said fly ash is ASTM Class F fly ash.

8. The composition of claim 1 wherein said hollow glass spheres are present in an amount in the range of from about 21% to about 310% by weight of said coarse particulate hydraulic cement in said composition.

9. The composition of claim 1 wherein said water is selected from the group consisting of fresh water, saturated salt solutions and unsaturated salt solutions.

10. The composition of claim 9 wherein said water is present in an amount in the range of from about 128% to about 400% by weight of said coarse particulate hydraulic cement in said composition.

11. The composition of claim 1 which further comprises a fluid loss control additive.

12. The composition of claim 11 wherein said fluid loss control additive is a mixture of a graft copolymer comprised of a backbone of lignin, lignite or salts thereof and a grafted pendant group of 2-acrylamido-2-methylpropanesulfonic acid and a copolymer or copolymer salt of N,N-dimethylacrylamide and 2-acrylamido-2-methylpropanesulfonic acid.

13. The composition of claim 12 wherein said fluid loss control additive is present in an amount in the range of from about 0.2% to about 8% by weight of said coarse particulate hydraulic cement in said composition.

14. The composition of claim 1 which further comprises a cement composition set accelerator.

15. The composition of claim 14 wherein said cement composition set accelerator is comprised of calcium chloride and is present in an amount in the range of from about 0.2% to about 12% by weight of said coarse particulate hydraulic cement in said composition.

16. The composition of claim 1 which further comprises a cement composition dispersing agent.

17. The composition of claim 16 wherein said cement composition dispersing agent is the condensation product of acetone, formaldehyde and sodium sulfite and is present in an amount in the range of from about 0.2% to about 8% by weight of said coarse particulate hydraulic cement in said composition.

18. The composition of claim 1 which further comprises a cement composition set retarder.

19. The composition of claim 18 wherein said cement composition set retarder is selected from the group consisting of a copolymer of 2-acrylamido-2-methylpropane sulfonic acid and acrylic acid and a copolymer of 2-acrylamido-2-methylpropane sulfonic acid and itaconic acid and is present in an amount in the range of from about 0.2% to about 8% by weight of said coarse particulate hydraulic cement in said composition.

20. The composition of claim 1 which further comprises silica flour to prevent set cement strength retrogression at elevated temperatures present in an amount in the range of from about 20% to about 60% by weight of said coarse particulate hydraulic cement in said composition.

* * * * *